United States Patent [19]

Bessho

[11] Patent Number: 5,240,382
[45] Date of Patent: Aug. 31, 1993

[54] CONVERGED MAGNETIC FLUX TYPE INTENSE MAGNETIC FIELD ELECTRO-MAGNETIC PUMP

[75] Inventor: Kazuo Bessho, Kanagawa, Japan
[73] Assignee: Kanazawa University, Kanazawa, Japan
[21] Appl. No.: 802,282
[22] Filed: Dec. 4, 1991
[30] Foreign Application Priority Data Dec. 17, 1990 [JP] Japan ................. 2-411103
Nov. 15, 1991 [JP] Japan ................. 3-300416

[51] Int. Cl.$^5$ ............................. H02K 44/06
[52] U.S. Cl. .............................. 417/50; 310/11
[58] Field of Search ....................... 417/50; 310/11

[56] References Cited

FOREIGN PATENT DOCUMENTS 831399 3/1960 United Kingdom ............ 417/50

Primary Examiner—Richard A. Bertsch
Assistant Examiner—David W. Scheuermann
Attorney, Agent, or Firm—Spencer, Frank & Schneider

[57] ABSTRACT

A converged magnetic flux type electro-magnetic pump in which plural circular conductor plates provided with slits reaching peripheries from central holes in the plates and plural exciting spiral coils are alternately stacked with respect to each other and individually surrounded by magnetic frames. A high density traveling magnetic flux is generated by eddy currents concentrated around the central holes of the circular conductor plates in response to the application of a multiphase alternating voltage in a non-magnetic pipe passing through the central holes with a cylindrical iron core inserted in the pipe, so as to convey high temperature molten metal such as molten sodium used for refrigerating a high speed breeder reactor. The thickness of the central portions of the circular conductor plates is greater than the remainder of the plates, so as to form a radial T-shaped cross-section. Eddy currents concentrated in the central portions of the circular conductor plates are dispersed in the axial direction by increasing the thickness thereof, so as to prevent local overheating and to increase the applied voltage, effective magnetic flux and output thrust and hence improve the efficiency and molten metal conveyance.

6 Claims, 19 Drawing Sheets

FIG_1
PRIOR ART

FIG_4
PRIOR ART

FIG_11

FIG._12

FIG_13

FIG_14

FIG_17
PRIOR ART
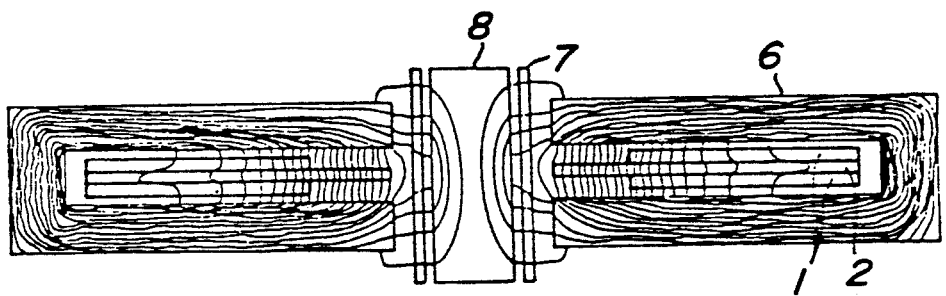
FIG_18
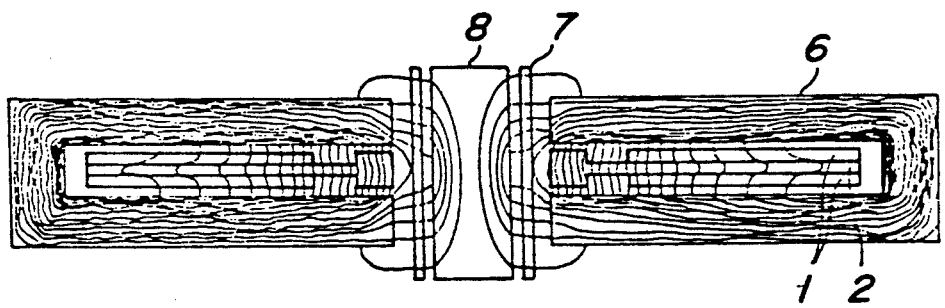

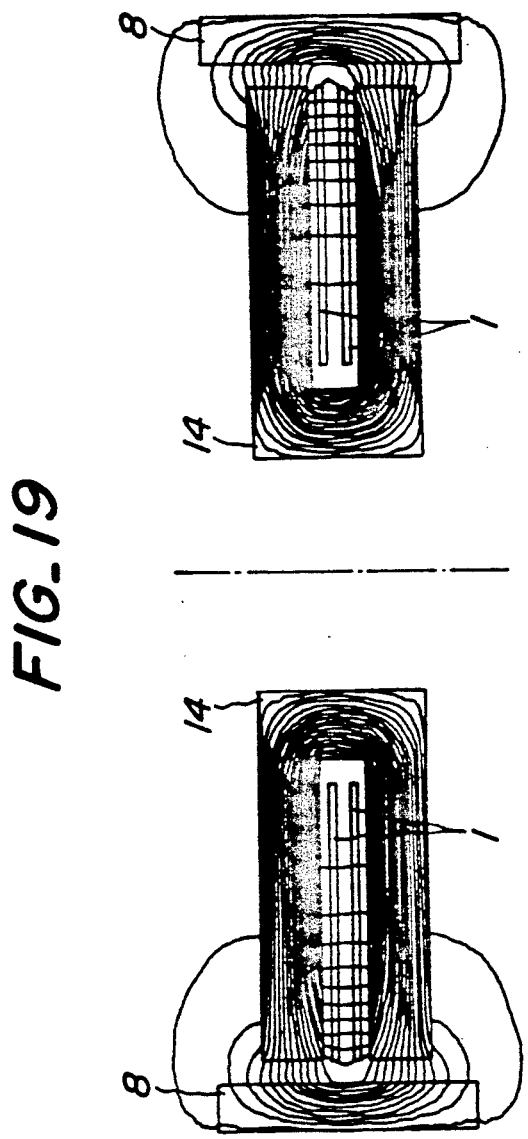
FIG_19

CONVERGED MAGNETIC FLUX TYPE INTENSE MAGNETIC FIELD ELECTRO-MAGNETIC PUMP

BACKGROUND OF THE INVENTION

Field of the Invention

The present invention relates to an electro-magnetic pump for conveying molten metal through a pipe by electro-magnetically applying a thrust thereon from the surroundings around the pipe. In particular, the invention relates to a converged magnetic flux type intense magnetic field electro-magnetic pump which can powerfully convey molten metal through a pipe to which is applied a traveling magnetic field formed by converging magnetic flux induced in the pipe by eddy currents generated by multiphase alternating current exciting coils. The flux is generated in metal plates individually inserted between the coils and is together with magnetic fluxes induced in magnetic material frames surrounding the exciting coils. In order to prevent local overheating and thereby increase the applied exciting voltage, the effective magnetic fluxes and the output thrust on account of the axial dispersion of the eddy currents are concentrated into central portions of the metal plates inserted between the exciting coils.

Related Art Statement

Up to the present, various countries have made extraordinary efforts to design an apparatus for conveying high temperature molten metal. Particularly, the development of a large capacity pump of the electro-magnetic induction type suitable for circulating molten sodium used as a refrigerant of a high speed breeder reactor, which is noteworthy for an energy source of the next generation, has been treated as an urgent theme of research immediately before the practical utilization of the high speed breeder reactor, and hence the research concerned has been advanced as a national task in each advanced country.

However, in the conventional form of linear induction type electro-magnetic pump, the magnetic flux density of the traveling magnetic field generated in the conveying pipe is small, and hence the output amount of the pump is insufficient. Consequently, the conventional pump of this type can be hardly used when a large capacity is required, so that the development of an electro-magnetic pump of a new type is internationally expected.

That is, as for a pump employed for conveying high temperature molten metal taken from a blast furnace, particularly, and for circulating molten sodium used as a refrigerant of a high speed breeder reactor, a conventional rotary blade type pump is questionable with regard to safety in the long run, so that, under the present condition, a linear induction type electro-magnetic pump is regarded as the most suitable and hence various forms of pumps of this type have been developed and further those of small capacity are already used in practice.

However, in the conventional forms of the linear induction type electro-magnetic pump, the magnetic flux density in the conveying pipe is comparatively small, that is, no more than about 3,000 gausses, and hence the sufficient thrust can be hardly obtained and the output of a pump of this type is insufficient, so that it is difficult to realize an electro-magnetic pump of large capacity.

Consequently, the present inventor proposed "a converged magnetic flux type electro-magnetic pump" according to U.S. patent application No. 664,566 (EPC application No. 91 30 1971.7), and then developed an electro-magnetic pump of this type in which the peculiarity of the conveyance of molten metal was remarkably improved in comparison with that of the conventional pump. However, this developed pump was somewhat questionable when used in an application requiring large capacity. Thus, the removal of this difficulty and further improvement of the pump characteristics has been expected.

SUMMARY OF THE INVENTION

An object of the present invention is to remove the above mentioned difficulty and to provide an electro-magnetic pump of sufficiently large capacity by further improving the characteristics of the above developed converged magnetic flux type electro-magnetic pump.

Another object of the present invention is to provide a new large-sized electro-magnetic pump having a high efficiency and a large capacity by further improving the converged magnetic flux type electro-magnetic pump and by making the best of the characteristics thereof, which was developed by remarkably improving the conventional electro-magnetic pump having a low magnetic flux density for the induced traveling magnetic field and hence an insufficient thrust and output amount except for applications requiring a comparatively small capacity.

The present invention is a converged magnetic flux type electro-magnetic pump arranged such that exciting spiral coils and circular conductor plates provided with radial slots individually are alternately stacked and the stack is surrounded by magnetic frames formed, for instance, of laminated iron plates. Further, a non-magnetic pipe passing successively through central holes of the circular conductor plates is provided. The thickness of central portions of the circular conductor plates surrounding the central holes thereof forms a radial cross-section having a T-shape, and the diameters of the central holes and the non-magnetic pipe passing through those central holes is increased. Another non-magnetic pipe having a smaller diameter is inserted through the above mentioned pipe having an increased diameter thereby forming a double pipe. Molten metal is conveyed through an inner gap of the double pipe. Inside the inner pipe, cylindrical magnetic cores are arranged for converging a high density magnetic fluxes of a traveling magnetic field induced inside the inner pipe, or inner alternate stacks of exciting spiral coils, annular conductor plates and inner magnetic frames surrounding those inner stacks are arranged which correspond respectively to the outer alternate stacks of exciting spiral coils surrounding the outer pipe and circular conductor plates having a T-shaped radial cross-section with increased thickness of the central portions and outer magnetic frames surrounding those outer stacks. In this way, a local concentration of magnetic flux in the inner gap of the double pipe is prevented thereby facilitating achievement of a uniformly increased magnetic flux density.

In other words, a converged magnetic flux type intense magnetic field electro-magnetic pump according to the present invention comprises a plurality of exciting spiral coils wound with the same polarity and engaged to each other, a plurality of circular conductor plates inserted individually between said plurality of exciting spiral coils and provided individually with radial slits reaching the outer peripheries thereof and central holes coaxially conducted to each other, and a plurality of substantially U-shaped magnetic frames surrounding individually outer peripheries of cross-sections of said exciting spiral coils and said circular conductor plates for forming closed magnetic circuits through said central holes so as to individually provide unitary magnetic flux generating elements. A plurality of the unitary magnetic flux generating elements are arranged close to each other in the axial direction of said central holes, axially traveling magnetic flux being generated in said central holes conducted to each other by converging eddy currents generated in said circular conductor plate in response to multiphase alternating currents applied to said exciting spiral coils into the central portions surrounding said central holes along said radial slits. Other traveling magnetic flux is generated in said closed magnetic circuits formed of said magnetic frames superposed in phase on said traveling magnetic fluxes in said central holes, and the mutually superposed magnetic flux is converged by coaxially providing magnetic flux converging members partially forming said closed magnetic circuits inside a non-magnetic pipe passing through said central holes conducted to each other, so as to apply an axial thrust on molten metal in said non-magnetic pipe, and especially featured by increasing the thickness of the central portions of said circular conductor plates, so as to form the radial cross-section substantially in T-shape.

Consequently, according to the present invention, in the converged magnetic flux type electro-magnetic pump previously proposed by the present inventor, the characteristic of which is remarkably improved in comparison with that of the conventional form of annular induction type electro-magnetic pump by surrounding plural exciting spiral coils and plural circular conductor plates alternately stacked to each other with magnetic frames and by generating a traveling magnetic field having high magnetic flux density in the central holes of the circular conductor plates according to the concentration of eddy currents through the applied multiphase alternating voltage, the concentrated eddy currents are dispersed in the axial direction according to the increased thickness of central portions of the circular conductor plates. As a result, any local overheating can be prevented and the applied voltage, the effective magnetic fluxes and the output thrust can be increased, so as to facilitate the further improvement of the efficiency and the characteristics of the conveyance of molten metal.

In other words, according to the present invention, the radial cross-section of the portion of the eddy current generating circular conductor plate, which portion is in contact with the pipe for conveying high temperature molten metal, is formed in the shape of a T, so that local overheating caused by the concentration of eddy currents in the portion concerned can be prevented and hence the increase of output thrust can be facilitated by reducing the loss and raising the applied voltage. Further the axial thrust effecting on molten metal can be increased by the increase of the effective magnetic flux in the double pipe, that is, the radial magnetic flux according to the decrease of leakage magnetic flux. As a result, a large-scaled electro-magnetic pump suitable for the conveyance of high temperature molten metal, the circulation of molten sodium for refrigerating a high speed breeder reactor and the driving of a magnetic accelerator an be realized.

In this connection, the above mentioned operational effects of the present invention can be obtained with a pump of comparatively small capacity, in which the magnetic flux converging member in the molten metal conveying pipe is formed of a cylindrical magnetic core. These effects can also be obtained for a pump of large capacity, in which the actively effecting magnetic flux converging member is employed.

BRIEF DESCRIPTION OF THE DRAWINGS

For the better understanding of the invention, reference is made to the accompanying drawings, in which

FIG. 17 is a diagram showing the state of magnetic flux distribution in the unitary element of the conventional converged magnetic flux type electro-magnetic pump;

FIG. 18 is a diagram showing the state of magnetic flux distribution in the unitary element of the first embodiment of the converged magnetic flux type intense magnetic field electro-magnetic pump according to the present invention;

FIG. 19 is a diagram showing the state of magnetic flux distribution in the inner unitary element of the third embodiment of the same without the circular conductor plate.

Figure 1:
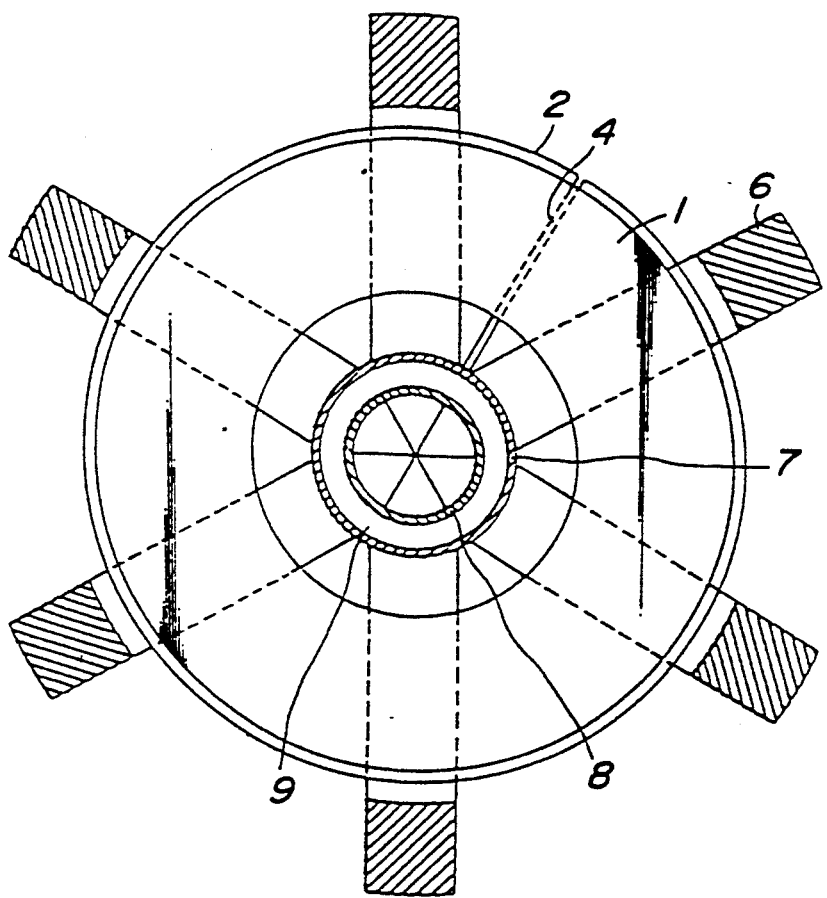
FIG. 1 is a side cross-sectional view showing a conventional converged magnetic flux type electro-magnetic pump.

Through different views of the drawings,

1 ... outer exciting spiral coil
2 ... outer circular conductor plate
3 ... central hole
4 ... slit
5 ... space
6 ... magnetic material frame
7 ... (outer)non-magnetic material pipe
8 ... cylindrical magnetic core
9 ... gap
10 ... surroundings of central hole
11 ... teeth-like portion
12 ... recess
13 ... inner non-magnetic material pipe
14 ... inner magnetic material frame
15,16 ... inner exciting spiral coil
17 ... inner circular conductor plate
18 ... eddy current

DESCRIPTION OF THE PREFERRED EMBODIMENTS

The embodiments of the present invention will be described in detail by referring hereinafter to the accompanying drawings.

Figure 2:
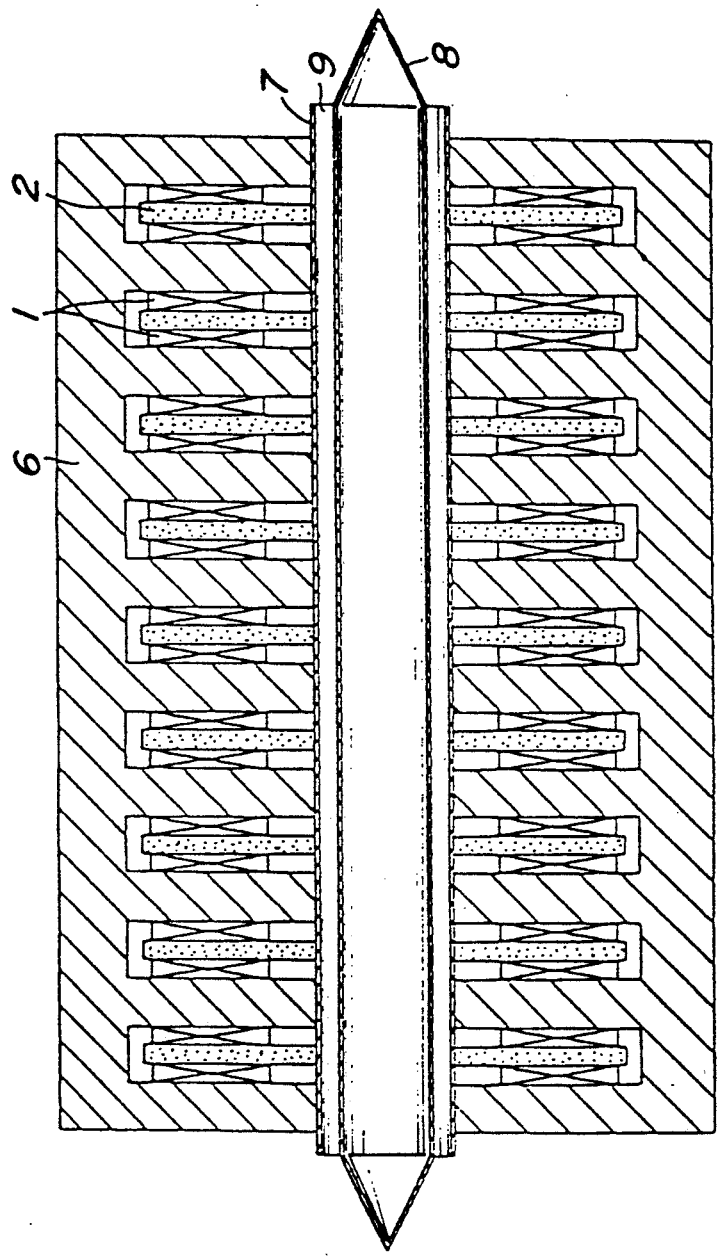
FIG. 2 is a cross-sectional elevation showing the pump of FIG. 1.

First, "a converged magnetic flux type electro-magnetic pump", which was previously proposed by the present inventor and which is improved by the present invention, will be described by referring to FIG. 1 showing a side cross-sectional view thereof and FIG. 2 showing a cross-sectional elevation thereof.

Figure 3:
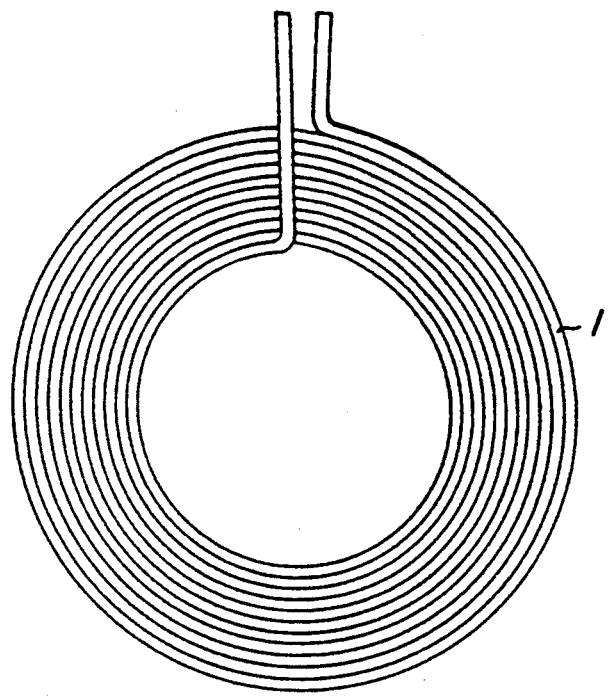
FIG. 3 is an elevation showing an exciting spiral coil of the same.
Figure 4:
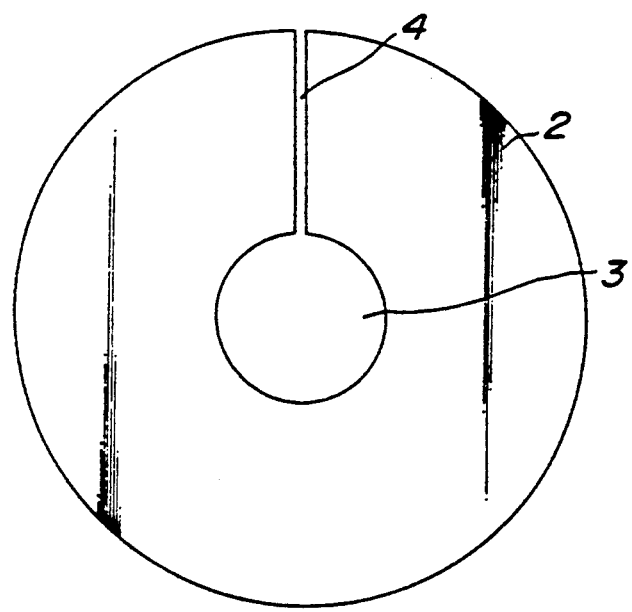
FIG. 4 is an elevation showing a circular conductor plate of the same.

FIG. 1 shows a side cross-sectional view taken perpendicular to an axis at the boundary between an exciting spiral coil 1 and a circular conductor plate 2, and FIG. 2 shows a cross-sectional elevation thereof containing the axis. In the structure shown in these drawings, plural exciting spiral coils 1 which are each spirally wound as shown in FIG. 3, and plural eddy current generating circular conductor plates 2 which are provided individually with radial slits 4 reaching their outer peripheries from central holes 3, as shown in FIG. 4, are closely stacked with respect to each other. Alternatively, plural unitary elements in which each circular conductor plate 2 is inserted between each pair of exciting spiral coils 1 as shown in FIG. 2 are arranged apart from each other. In these structures, which are surrounded by U shaped magnetic laminated iron plates axially-symmetric in the radial direction, central holes 3 of each circular conductor plates 2 are connected with each other, and a non-magnetic material pipe 7 is inserted therein. Further, a cylindrical magnetic material core 8 formed, for instance, of laminated iron plates is inserted in the pipe 7, so as to convey molten metal in a gap 9 between the pipe 7 and the cylindrical core 8.

In the above-mentioned conventional structure of the converged magnetic flux type electro-magnetic pump, when the exciting spiral coils 1 consisting individually in each unitary elements are connected successively to each other in the same polarity and a three phase alternating voltage applied thereto, an axial traveling magnetic field induced by eddy currents generated in circular conductor plates 2 and concentrated around the central portions thereof is formed in the gap 9. As a result, eddy currents flow in molten metal in the gap 9, so as to generate a thrust which affects and conveys molten metal in the axial direction of an electro-magnetic pump.

Figure 5:
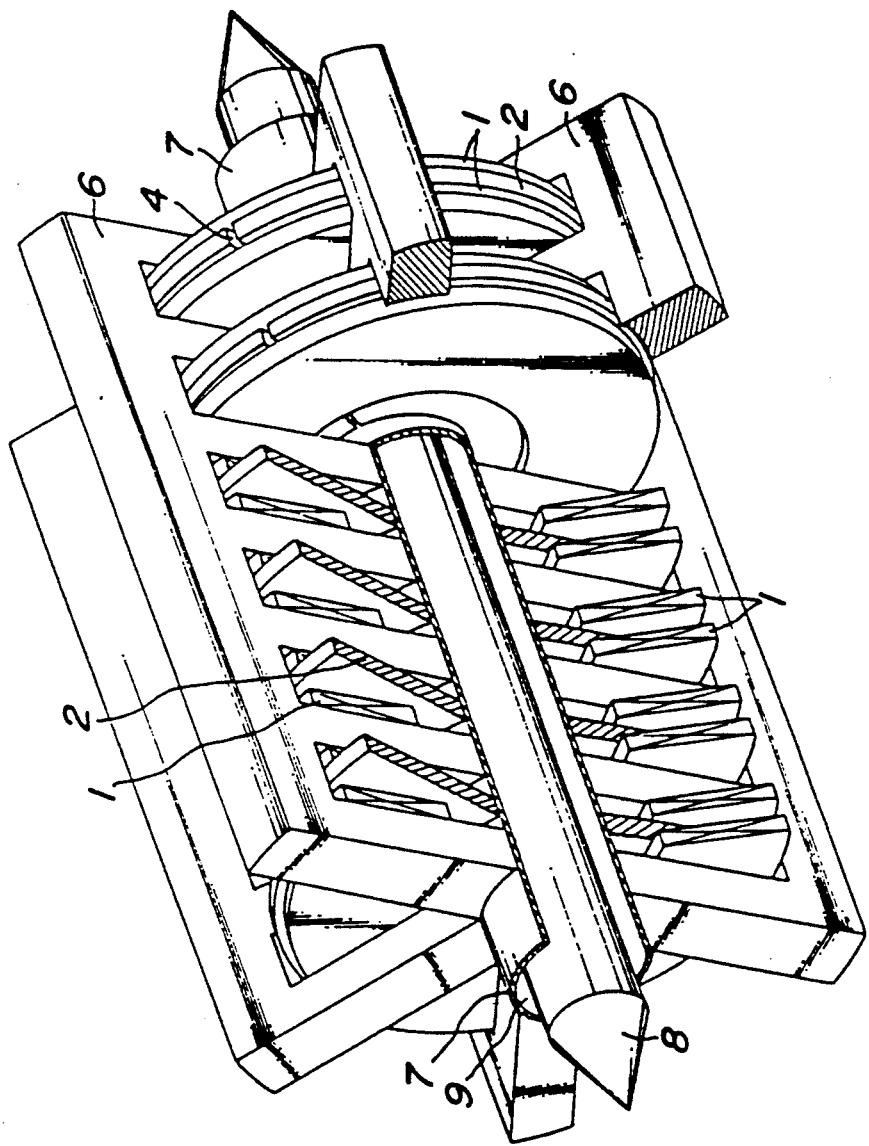
FIG. 5 is a perspective view showing a partly broken view of the same.

The partly broken appearance of the conventional converged magnetic flux type electro-magnetic pump as arranged as mentioned above is shown in FIG. 5.

According to the present invention, the characteristic of the converged magnetic flux type electro-magnetic pump arranged as mentioned above is further improved by deforming the circular conductor plates 2, particularly, by deforming the central portions thereof and by doubly arranging the molten metal conveying non-magnetic material pipe. Unitary elements similar to those arranged around the outer pipe are provided in the inner pipe in correspondence with each other so as to generate a traveling magnetic field of high magnetic flux density which is uniformly distributed in the gap between the outer and inner pipes.

Figure 6:
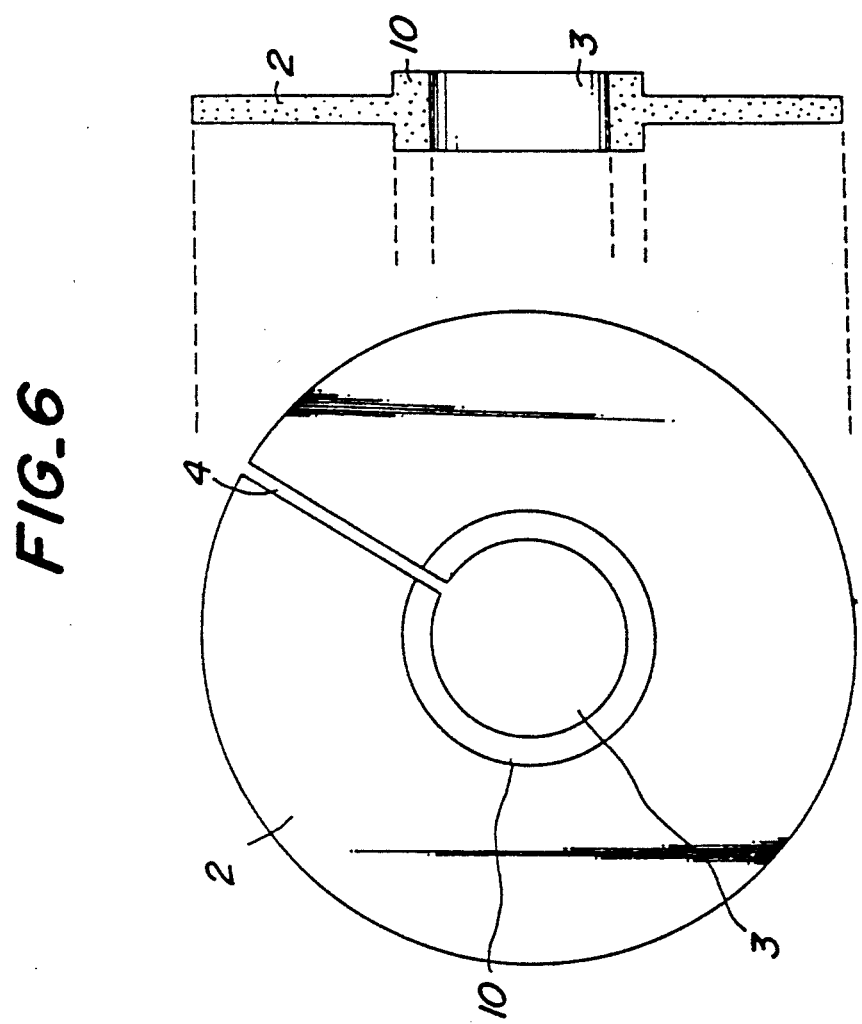
FIG. 6 is an elevation and a side cross-sectional view showing a circular conductor plate of a converged magnetic flux type intense magnetic field electro-magnetic pump according to the present invention.

The elevation and the cross-section of the circular conductor plate 2 of the first embodiment of a converged magnetic flux type intense magnetic field electro-magnetic pump arranged as mentioned above according to the present invention are shown in FIG. 6. As for the circular conductor plate 2 as shown in FIG. 6, the thickness of the surrounding portions 10 of the central hole 3 is greatly increased in comparison with that of the remaining portion of the plate so as to arrange the radial cross-section thereof in a T-shape.

Figure 7:
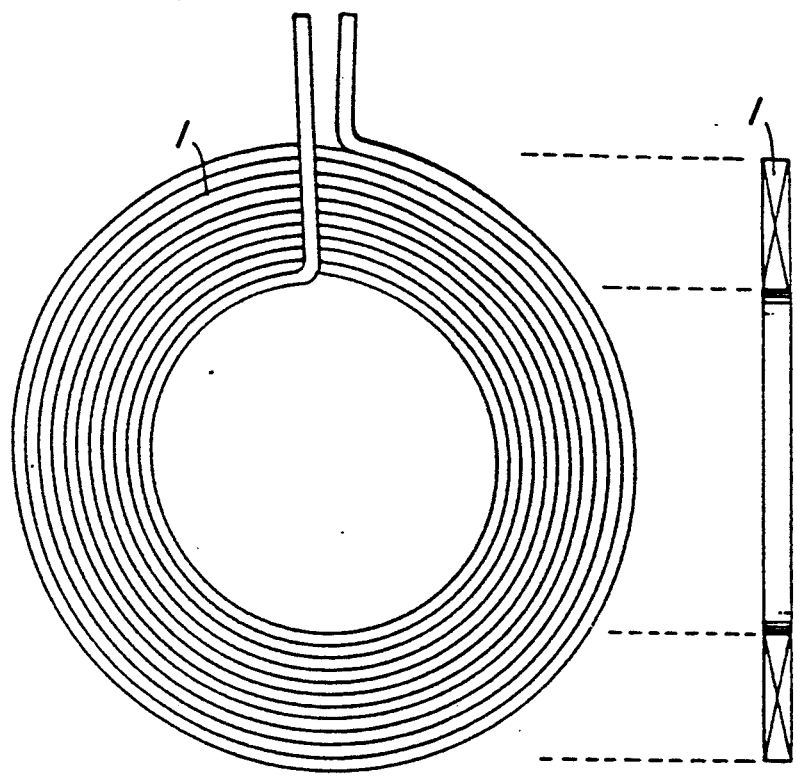
FIG. 7 is an elevation and a side cross-sectional view showing an exciting spiral coil of the invention.
Figure 8:
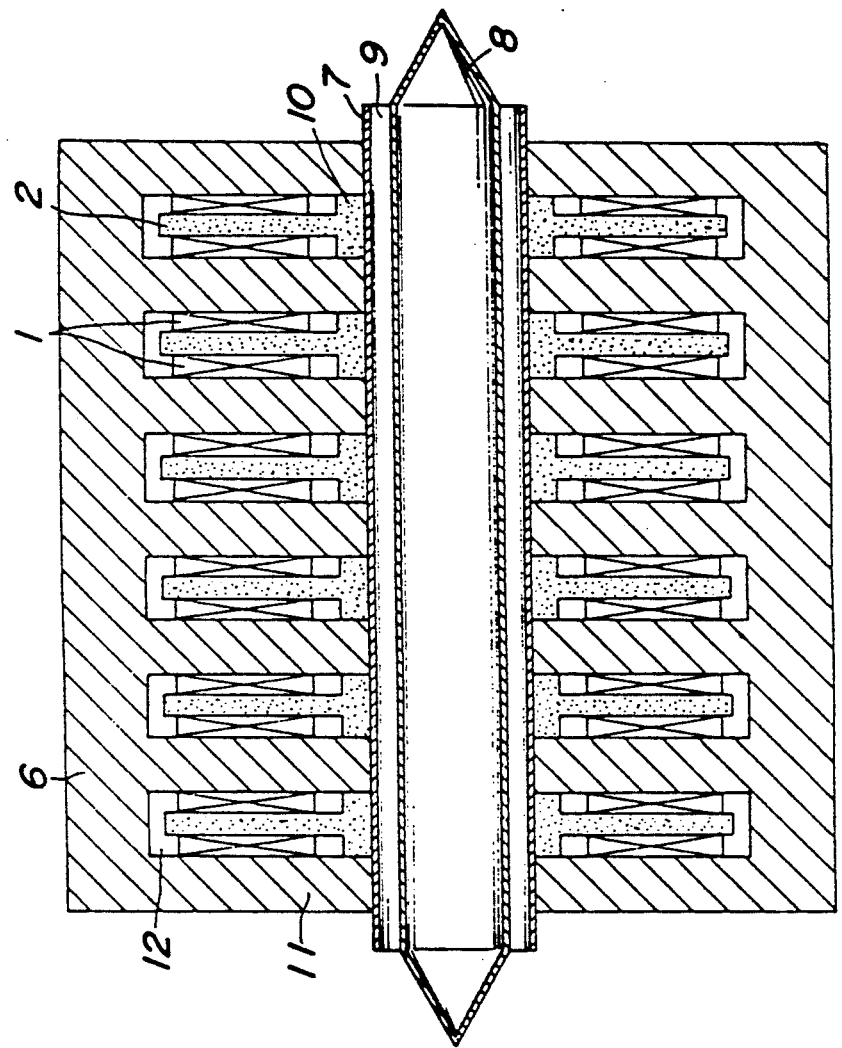
FIG. 8 is a cross-sectional elevation of the first embodiment of the same.
Figure 10:
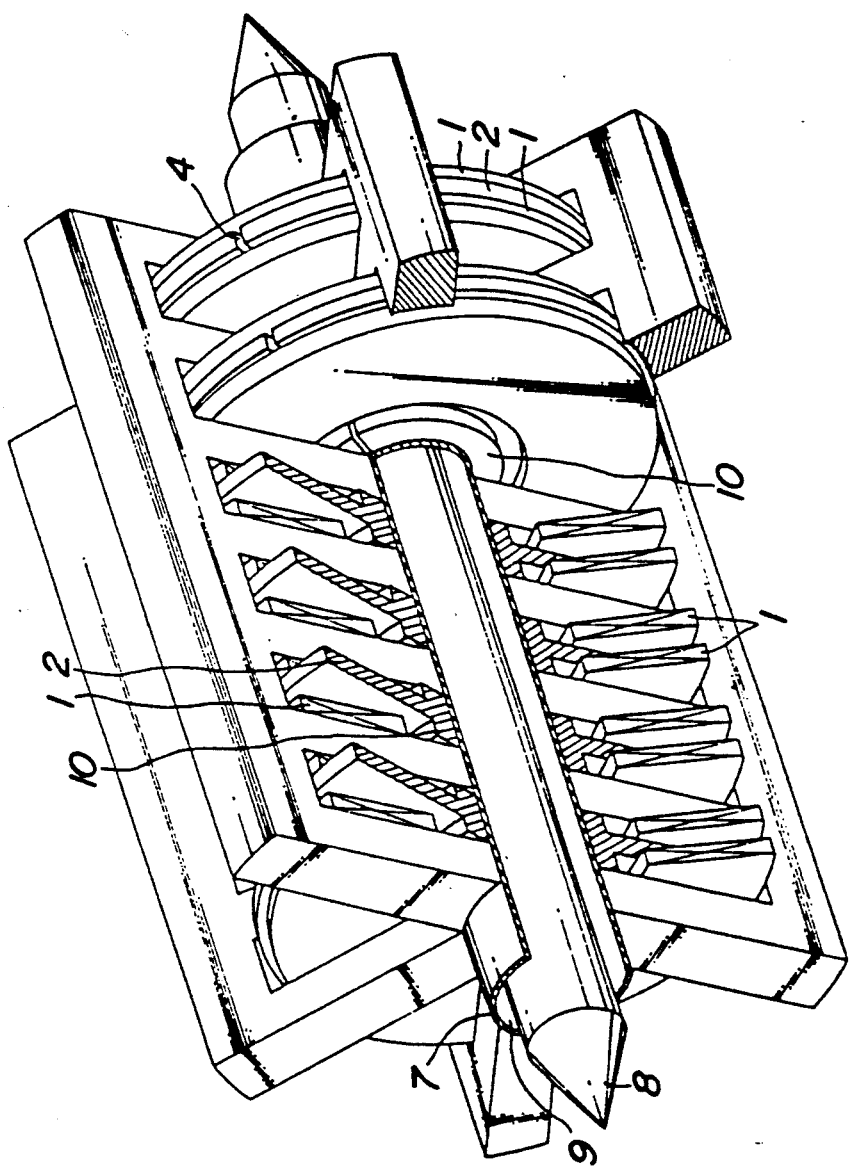
FIG. 10 is a perspective view showing a partly broken view of the first embodiment of the same.

On both sides of the circular conductor plate 2 arranged as mentioned above, a pair of exciting spiral coils 1, the central spaces of which are slightly larger than the surrounding portion 10 of the circular conductor plate 2 as shown in FIG. 7, are combined with the circular conductor plate 2 as shown in the cross-sectional elevation of FIG. 8 and in the perspective view of FIG. 10 for the unitary element.

Figure 9:
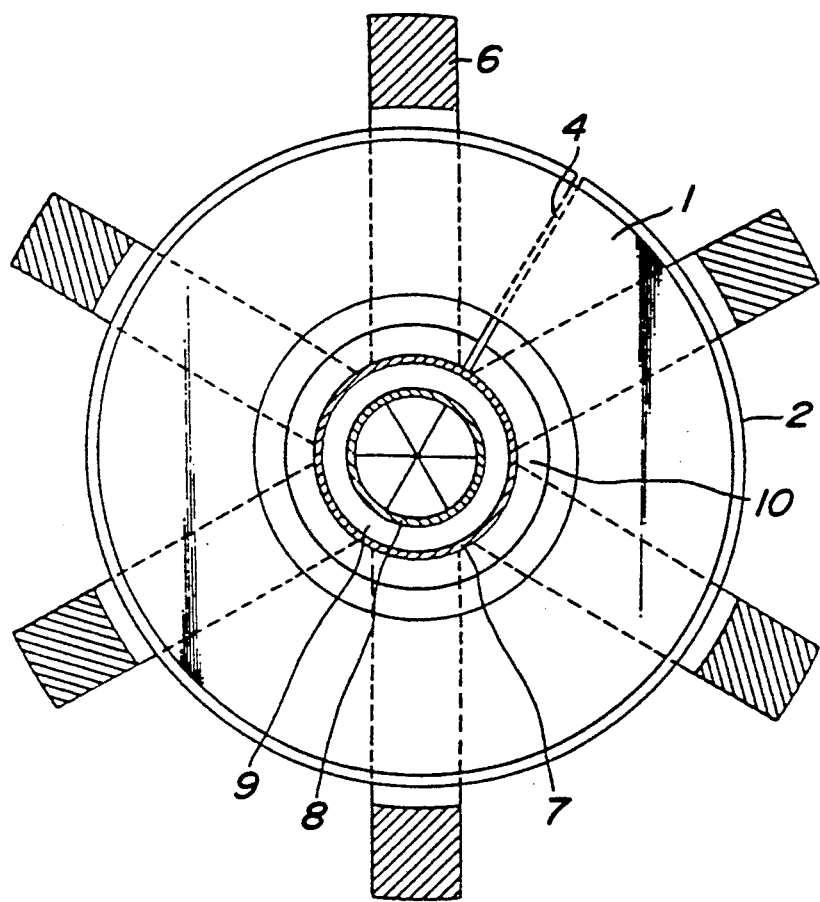
FIG. 9 is a side sectional view showing the first embodiment of the same.

In this connection, a side cross-sectional view of the above mentioned combination is shown in FIG. 9 which is similar to that shown in FIG. 1.

As apparent from these related drawings, in the first embodiment of the intense magnetic field electro-magnetic pump according to the present invention, plural unitary elements as mentioned above are arranged in the axial direction and these arranged unitary elements are surrounded by a magnetic material frame 6 which is provided with teeth-like portions 11 and recesses 12 individually in the radial direction for each unitary elements and are formed, for instance, of laminated iron plates. The central holes 3 of each circular conductor plates 2 are connected with each other and are provided with a non-magnetic metal pipe 7 therein, in which pipe 7 a cylindrical magnetic core 8 formed of ferromagnetic material is coaxially arranged, so as to convey molten metal through a gap 9 between the pipe 7 and the core 8. As can be seen from FIG. 8, the portions 10 surrounding the central holes 3 of the circular conductor plates 2 have thicknesses equal to the width of the recesses 12.

In the above mentioned arrangement, when the exciting spiral coils 1 comprising each unitary elements are appropriately connected in series and a three phase alternating voltage is applied across both ends of the series connection of coils 1, a uniformly distributed traveling magnetic field of high magnetic flux density is generated in the gap 9, and, as a result, an intense thrust in the axial direction is generated by the interaction between this traveling magnetic field and eddy currents generated in the molten metal, so as to realize an electro-magnetic pump for conveying molten metal.

Figure 11:
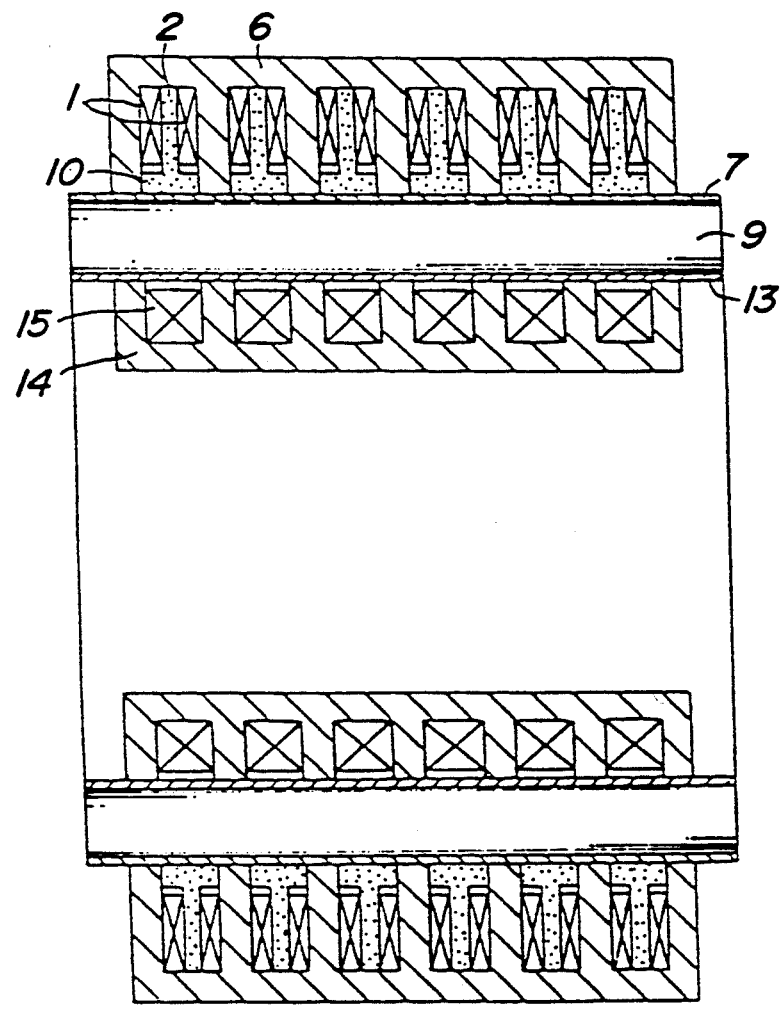
FIG. 11 is a cross-sectional elevation showing a second embodiment of the same.
Figure 12:
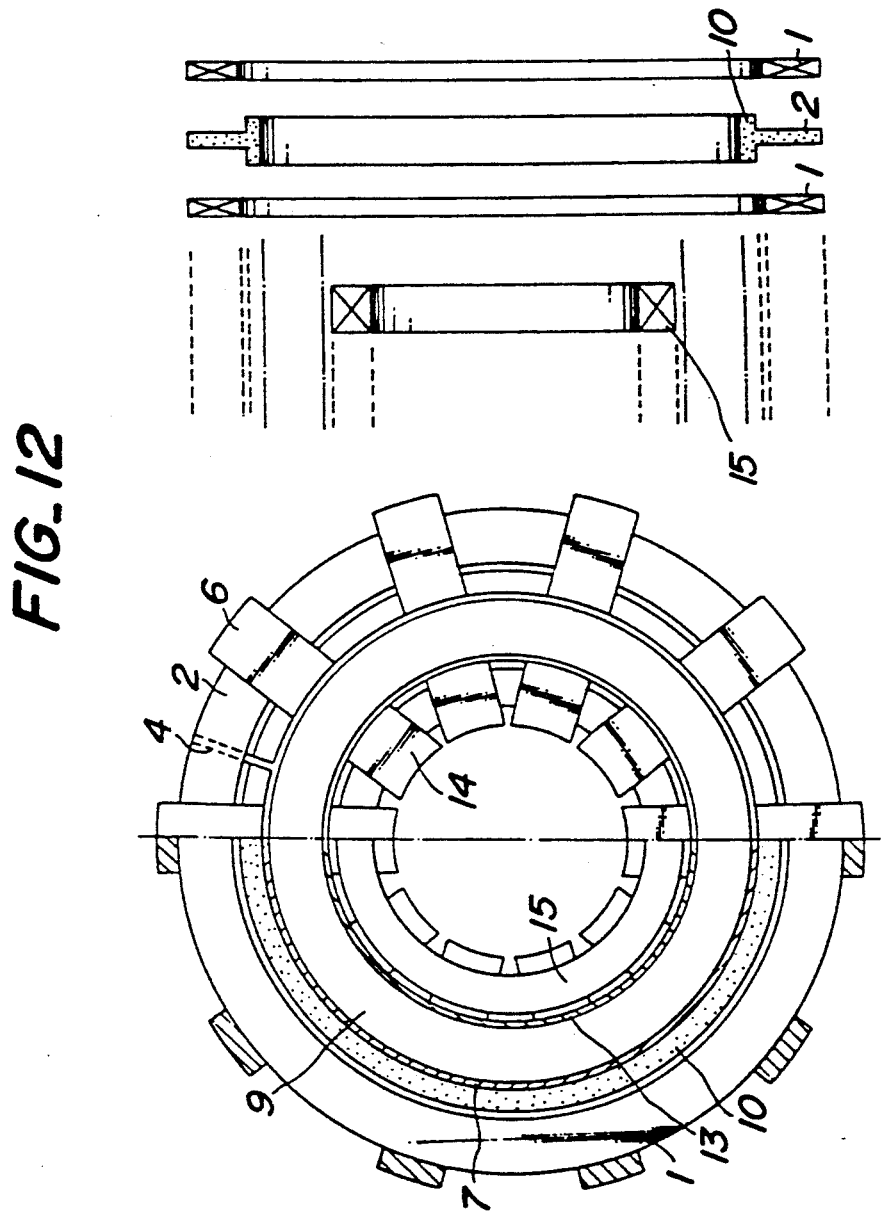
FIG. 12 is a combination of a side view and a side cross-sectional view showing the second embodiment of the same together with a cross-sectional view showing a unitary element thereof.

Next, as for the second embodiment of the converged magnetic flux type intense magnetic field electro-magnetic pump according to the present invention, a cross-sectional elevation thereof is shown in FIG. 11 which is similar to FIG. 8, and a combination of a side view and a side cross-sectional view thereof is shown in FIG. 12 together with a cross-sectional view of the unitary element. In this embodiment as shown in these drawings, the arrangement is such that the intense magnetic field electro-magnetic pump of the present invention can be used for applications requiring a large capacity. The diameter of the non-magnetic material pipe 7 is greatly increased in comparison with that shown in FIG. 8 and an inner non-magnetic material pipe 13 having a diameter which is appropriately smaller than that of the pipe 7 is coaxially arranged therein so as to form a double structure of pipes having a gap 9 formed between which pipes 7 and 13 molten metal is conveyed. Inside pipe 13 exciting spiral coils 15 individually surrounded in the radial direction by laminated iron cores 14 individually in correspondence to each unitary elements arranged outside the outer pipe 7 are arranged and connected in series to corresponding outer exciting spiral coils 1. Traveling magnetic fields are generated by both of the exciting spiral coils 1 and 15 respectively at the application of three phase alternating voltages superposed in phase with each other, so as to obtain a uniform and intense traveling magnetic field and hence to realize an electro-magnetic pump having remarkably greater capacity than that of the first embodiment.

Figure 13:
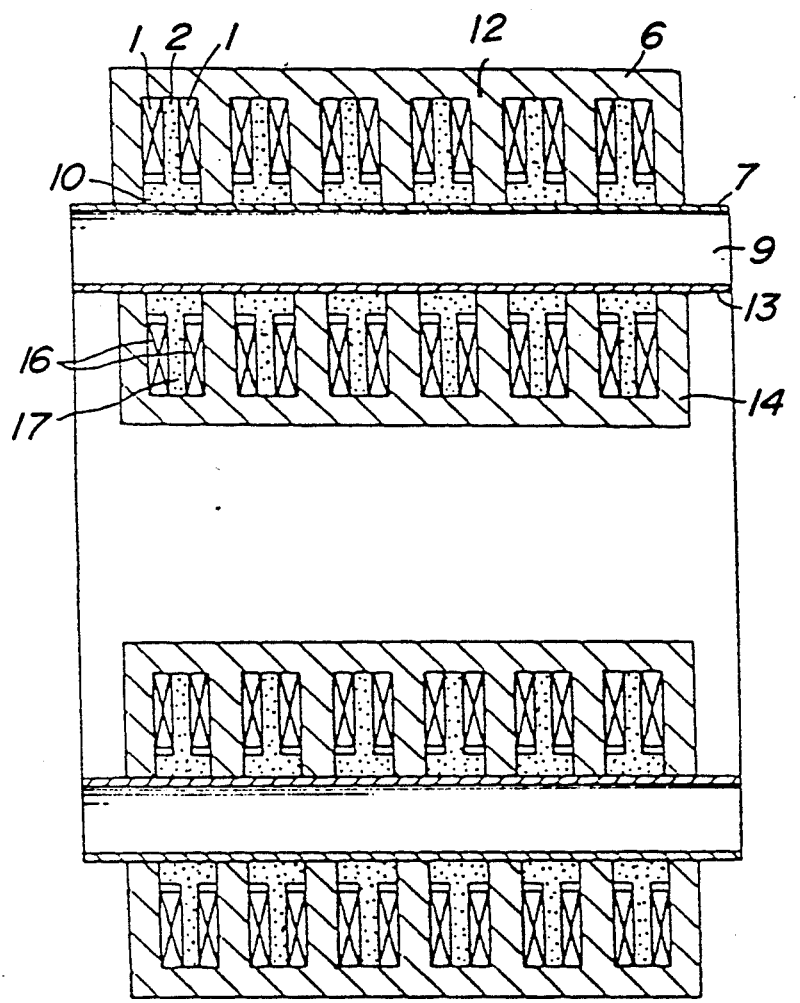
FIG. 13 is a cross-sectional elevation showing a third embodiment of the same.
Figure 14:
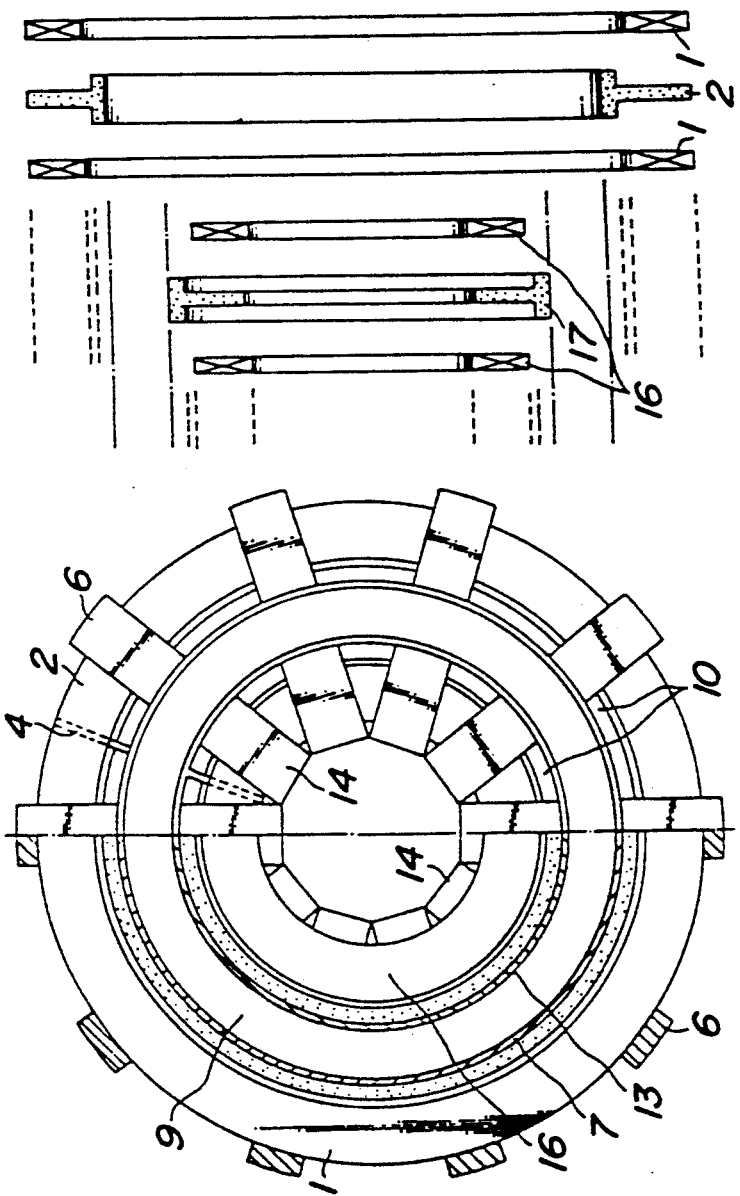
FIG. 14 is a combination of a side view and a side cross-sectional view showing the third embodiment of the same together with a cross-sectional view showing a unitary element thereof.
Figure 15:
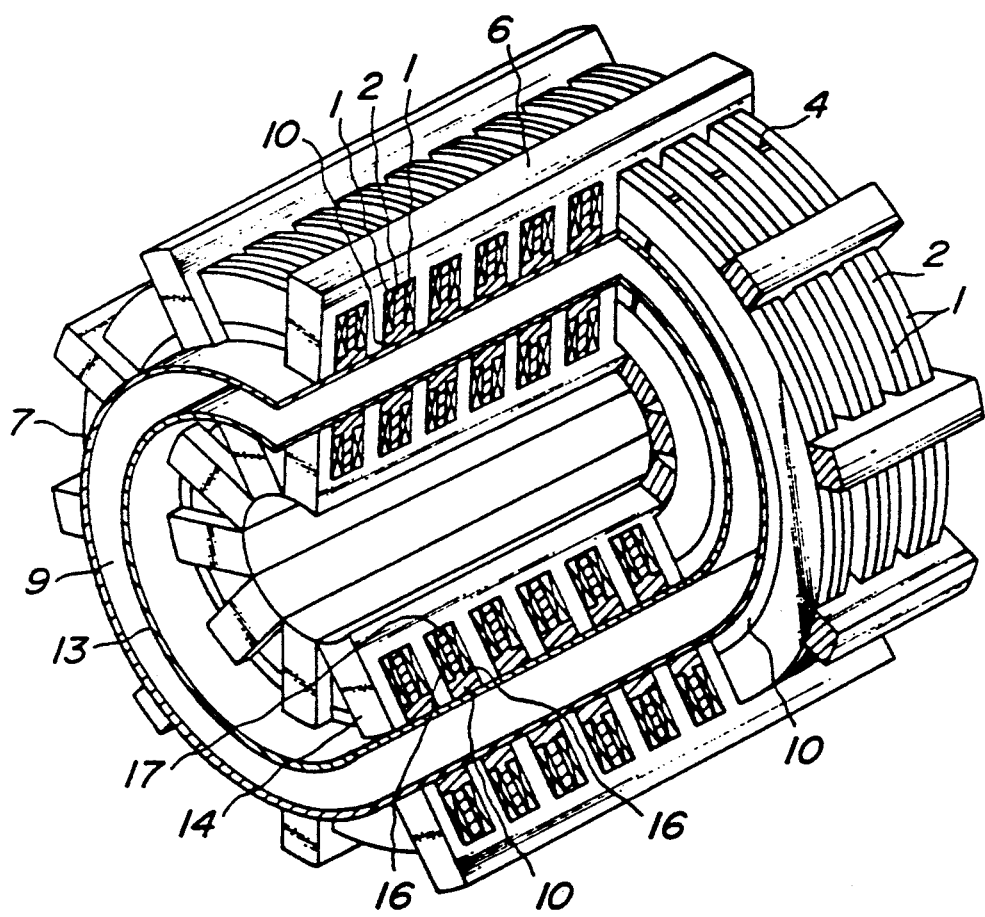
FIG. 15 is a perspective view showing a partly broken view of the third embodiment of the same.

Next, as for the third embodiment of the present invention which is suitable for obtaining still greater capacity, a cross-sectional elevation and a combination of a side view and a side cross-sectional view, which are similar to FIG. 11 and FIG. 12 showing the second embodiment, are shown in FIG. 13 and FIG. 14 respectively, while a partly broken view thereof similar to FIG. 10 showing that of the first embodiment is shown in FIG. 15.

In the third embodiment as shown in these drawings, inside the inner pipe 13 of the molten metal conveying double-structured pipe which is arranged similarly to the aforesaid second embodiment, the laminated iron core 14 is also arranged similarly to the arrangement of the second embodiment. In each of the recesses 12, the inner unitary elements individually corresponding to the outer unitary elements arranged outside the outer pipe 7 are symmetrical therewith and formed in a similar manner. That is, inner circular conductor plates 17 having peripheral portions of increased thickness in contact with the inner pipe 13 have radial cross-sections which are T-shaped and individually interposed between pairs of inner exciting spiral coils 16. In the thus arranged structure, mutually corresponding outer and inner exciting spiral coils 1 and 16 are connected in series with each other so that traveling magnetic fields respectively generated by those exciting spiral coils 1 and 16 at the application of a three phase alternating voltage are superposed in phase with each other, so as to obtain a further intense and uniform traveling magnetic field.

In the converged magnetic flux type intense magnetic field electro-magnetic pump according to the present invention as described above in detail, for example, in the first embodiment thereof, when the exciting spiral coils individually comprising each unitary elements are appropriately connected with each other and are applied with a three phase alternating voltage, the traveling magnetic field is generated in the non-magnetic material pipe surrounded by those exciting spiral coils, and, as a result, the thrust generated by the interaction between this traveling magnetic field and eddy currents induced in molten metal in the pipe is applied onto the molten metal, so as to realize an intense electro-magnetic pump. In this situation, a new eddy currents flow in the circular conductor plates individually stuck between each exciting spiral coils, and, as a result, the leakage magnetic flux is reduced, while the effective magnetic flux in the gap between the double-structured pipes is increased. Consequently, the thrust applied on molten metal is further increased, so as to rapidly improve the conveying characteristics of the electro-magnetic pump.

Figure 16:
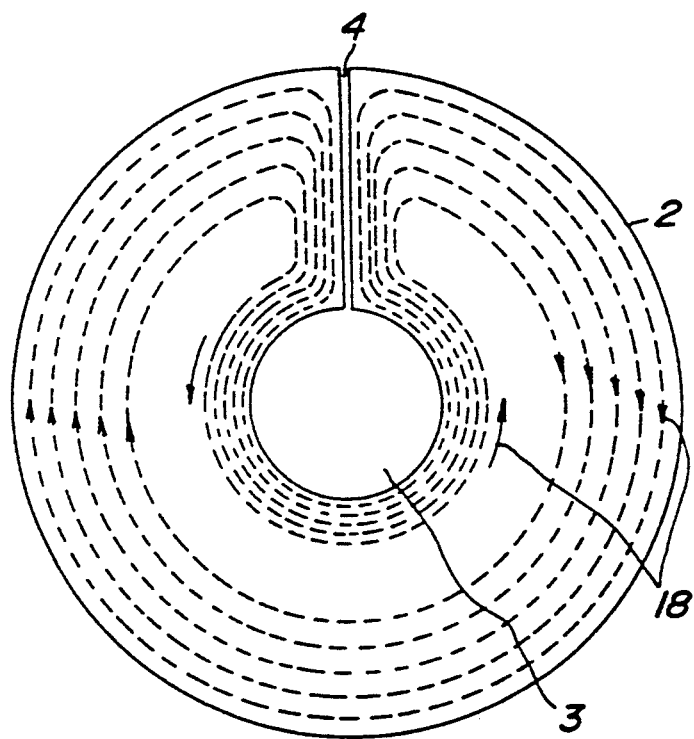
FIG. 16 is a diagram showing the distribution of eddy currents flowing in the circular conductor plate of the same.

Under these conditions, the eddy currents 18 distributed as shown in FIG. 16 flow in the circular conductor plates 2 and are then concentrated in the surrounding portions thereof around the central holes 3 along the slits 4, so as to intercept the leakage magnetic fluxes and hence to efficiently converge the induced magnetic fluxes into the central holes 3.

In this situation, when the thickness of the circular conductor plate is fixed or uniform from the periphery to the central portion, the defect that the concentrated eddy currents flow around the central hole 3 and hence the state of local overheating is caused and the temperature thereon is raised comes into question.

For removing this defect and obtaining an intense traveling magnetic field having a high magnetic flux density uniformly distributed in the axial direction, according to the present invention, the improvement such that the thickness of the surrounding portion around the central hole 3 of the circular conductor plate 2 is greatly increased in comparison with that of the remaining portions, as shown in FIGS. 6, 8, 10 and 13, so as to form the radial cross-section thereof in a T-shape is effected. As a result, the effective magnetic flux in the radial direction of the gap 9 between the double-structured pipes is increased, so as to improve the electro-magnetic pump obtained by the present invention.

As for the previously proposed converged magnetic flux type electro-magnetic pump, the distribution of magnetic flux, which is calculated as to the unitary element in the case that the eddy current inducing circular conductor plate having the uniform thickness is employed, is shown in FIG. 17. As for the intense magnetic field electro-magnetic pump according to the present invention, that, which is calculated as to the unitary element in the case that the circular conductor plate having a T-shaped radial cross-section is employed, is shown in FIG. 18. Consequently it is apparent from the comparison of these distributions with each other that it is remarkably effective to increase the thickness of the central portion of the circular conductor plate according to the present invention.

Figure 20:
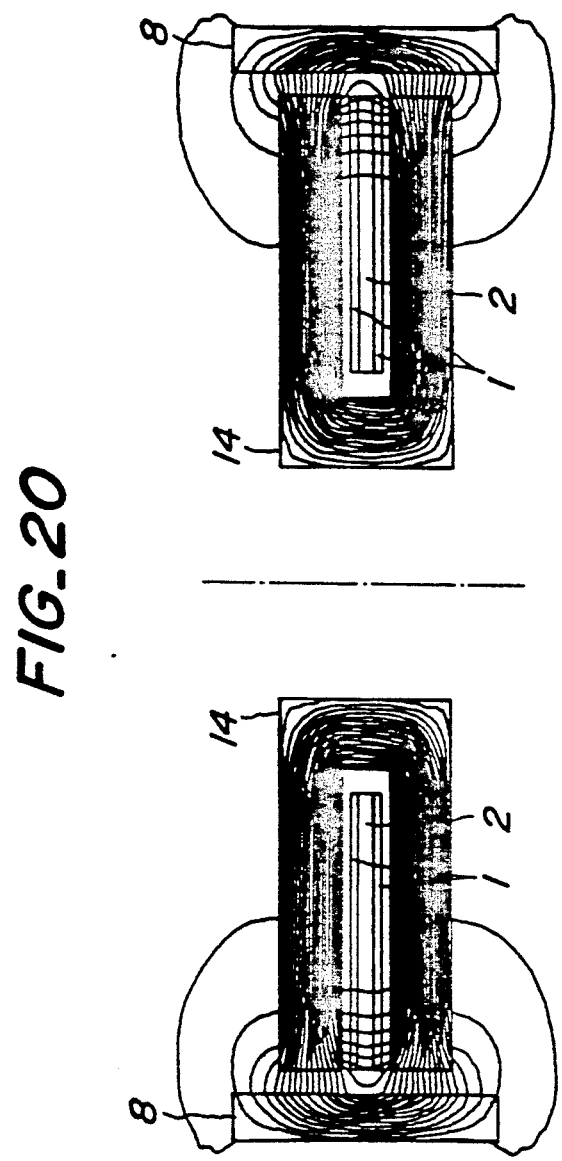
FIG. 20 is a diagram showing the state of magnetic flux distribution in the inner unitary element of the third embodiment of the same with the circular conductor plate.

Furthermore, the distribution of magnetic flux calculated in a manner similar to that mentioned above for the effect of shielding magnetic flux which is obtained by the circular conductor plate in the case that, inside the double-structured pipes in the intense magnetic field electro-magnetic pump according to the present invention also, unitary elements individually corresponding to the outer unitary elements are provided as shown in FIG. 20 in comparison with FIG. 19 showing the case in which the circular conductor plate are removed. Thus, it is evident from these drawings that the effect of magnetic flux similar to that shown in FIGS. 17 and 18 for the outer unitary element can be obtained for the inner unitary element also. In this connection, FIGS. 19 and 20 show the situation for the case in which the thickness of the circular conductor plate comprising the inner unitary element is uniform.

As is apparent from the above description, in the converged magnetic flux type intense magnetic field electro-magnetic pump of the present invention, the efficiency and the characteristics of the conveyance of molten metal can be remarkably improved only by modifying the shape of the radial cross-section of the eddy current inducing circular conductor plate, and, as a result, an electro-magnetic pump having an extremely large capacity with a remarkably large output can be readily realized. Further it is possible also to realize a super-large scaled electro-magnetic pump employing a similar principle.

In other words, the effects obtained by the present invention, in which, as for the previously proposed converged magnetic flux type electro-magnetic pump provided with an alternately repeated stack of exciting spiral coils and the eddy current generating circular conductor plates individually having radial slits, the thickness of the portions around the central holes of the circular conductor plate is increased so as to form the radial cross-section thereof in T-shape, are as follows.

(1) As for the eddy current generating circular conductor plate, eddy currents concentrated by the effect of the radial slit around the central hole are dispersed in the axial direction, so that the current density therein is reduced, so as to facilitate the prevention of local overheating conventionally caused by the concentration of eddy currents.

(2) The above-mentioned reduction of the current density in the surroundings of the central hole and hence the above-mentioned prevention of local overheating caused by the concentration of eddy currents around the central hole, which are effected by forming the radial cross-section of the circular conductor plate in a T-shape, facilitate increasing the voltage applied to a similarly scaled electro-magnetic pump and hence to increase the output thereof.

(3) In the situation that the radial cross-section of the circular conductor plate is formed in a T-shape, the concentratedly flowing eddy currents are dispersed along the non-magnetic metal pipe in the axial direction. Consequently, the leakage magnetic fluxes passing through the surroundings of the central hole of the circular conductor plate from the teeth-like portions of the magnetic material frame surrounding the unitary elements individually formed of the alternate stack of exciting spiral coils and circular conductor plates are reduced. Hence, the effective magnetic flux passing through the gap between the double-structured pipes is increased as much as the reduction of leakage magnetic flux, and, as a result, the thrust affecting the molten metal is increased and hence the output of the pump is also increased, so as to improve the efficiency of conveyance of the molten metal.

(4) In the intense magnetic field electro-magnetic pump according to the present invention, the inner diameter of the exciting spiral coils alternately stacked on the circular conductor plates is formed larger than that of the central hole of the circular conductor plate, so as to prevent heat conduction from the high temperature molten metal conveyed in the non-magnetic material pipe passing through the central hole. Accordingly, even when the thickness of the portion surrounding the central hole of the circular conductor plate is increased, so as to form the radial cross-section thereof in a T-shape, there is no influence on the remaining parts of the pump in view of the mutual relationship between the sizes of these parts.

What is claimed is:

1. A converged magnetic flux electro-magnetic pump having a longitudinal axis, comprising
  a plurality of spiral coils wound with the same polarity and distributed along said longitudinal axis, said plurality of spiral coils comprising a plurality of adjacent coil units, each of said coil units including a pair of adjacent coils;
  a plurality of substantially U-shaped magnetic frames having teeth-like portions with recesses of a given width therebetween, said coil units being located in the recesses of said magnetic frames;
  a plurality of circular conductor plates, one of said plates being interposed between the adjacent coils of each pair of coils of each of said coil units, each of said conductor plates having
    a central hole coaxial with said longitudinal axis, the thickness in the direction of said longitudinal axis of the portion of said plate being located radially around said central hole being greater than the thickness of the remainder of said plate and substantially equal to the width of the recess of said magnetic frame within which the coil unit is located; and
    a radial slit extending normal to said longitudinal axis between said central hole and an outer periphery of said plate;
  a non-magnetic pipe extending along said longitudinal axis located within the central holes of said outer conductor plates, said non-magnetic pipe being located within said plurality of magnetic frames;
  a magnetic flux converging member extending along said longitudinal axis, said converging member being located within said non-magnetic pipe; and
  means for applying multiphase alternating currents to said spiral coils, an axially traveling first magnetic flux being generated in the central holes of said plurality of circular conductor plates by converging eddy currents flowing in said plates in response to the multiphase alternating currents in the coils of said coil units, and a second traveling magnetic flux being superposed on said first flux and in phase therewith by said magnetic flux converging member, said first and second superposed flux applying an axial thrust to molten metal located in the space between said non-magnetic pipe and said magnetic flux converging member thereby causing said molten metal to flow in the direction of said longitudinal axis.

2. An electro-magnetic pump as claimed in claim 1 where said magnetic flux converging member is a cylindrical magnetic core.

3. A converged magnetic flux electro-magnetic pump having a longitudinal axis, comprising
  first and second pluralities of spiral coils wound with the same polarity and distributed along said longitudinal axis, said first and second pluralities of spiral coils comprising first and second pluralities of adjacent coil units respectively, each of said first coil units including a pair of adjacent coils;
  a plurality of outer circular conductor plates, one of said outer plates being interposed between the adjacent coils of each pair of coils of said first coil units, each of said outer conductor plates having a central hole coaxial with said longitudinal axis, the thickness in the direction of said longitudinal axis of the portion of said outer plate being located radially around said central hole being greater than the thickness of the remainder of said plate; and a radial slit extending normal to said longitudinal axis between said central hole and an outer periphery of said outer plate;

first and second pluralities of substantially U-shaped magnetic frames having teeth-like portions with recesses therebetween, said first and second coil units being located in the recesses of said first and second magnetic frames respectively;

first and second spaced non-magnetic pipes extending along said longitudinal axis located within the central holes of said outer conductor plates, said first non-magnetic pipe being located within said first plurality of magnetic frames and said second non-magnetic pipe being located within said second plurality of magnetic frames; and means for applying multiphase alternating currents to said spiral coils, a first axially traveling magnetic flux being generated in the central holes of said plurality of circular conductor plates by converging eddy currents flowing in said plates in response to the multiphase alternating currents in the coils of said first coil units, and a second traveling magnetic flux superposed on said first flux and in phase therewith being generated in response to the multiphase alternating current in the coils of said second coil units, said superposed flux applying an axial thrust to molten metal located in the space between said first and second non-magnetic pipes thereby causing said molten metal to flow in the direction of said longitudinal axis.

4. An electromagnetic pump as claimed in claim 3 wherein each recess in said first plurality of magnetic frames has a given width, and wherein the thickness in the direction of said longitudinal axis of the portion of each of said outer conductor plates located radially around said central hole is substantially equal to the width of the recess of the magnetic frame in which it is located.

5. An electromagnetic pump as claimed in claim 3 wherein each of said second coil units includes a pair of adjacent coils, and wherein a plurality of inner circular conductor plates is provided, one of said plurality of inner conductor plates being interposed between the adjacent coils of each pair of coils of said second coil units, the thickness in the direction of said longitudinal axis of said plate at the outer periphery thereof being greater than the thickness of the remainder of said plate.

6. An electromagnetic pump as claimed in claim 5 wherein each recess in said first and second pluralities of magnetic frames has a given width, and wherein the thickness in the direction of said longitudinal axis of the portion of each of said inner and outer conductor plates located radially around said central hole is substantially equal to the width of the recess of the magnetic frame in which it is located.

* * * * *